United States Patent
McLeod

(10) Patent No.: US 7,581,734 B1
(45) Date of Patent: Sep. 1, 2009

(54) PEEK COATED SEAL SURFACES

(75) Inventor: Christopher R. McLeod, Woodgrove Estates (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 780 days.

(21) Appl. No.: 09/562,379

(22) Filed: May 1, 2000

(51) Int. Cl.
*F16J 15/34* (2006.01)

(52) U.S. Cl. .................. 277/352; 277/377; 277/399; 277/404

(58) Field of Classification Search .................. 277/342, 277/352, 353, 377, 379, 402, 404, 394, 405, 277/406, 371, 399, 321
See application file for complete search history.

(56) References Cited

U.S. PATENT DOCUMENTS

| | | | | |
|---|---|---|---|---|
| 2,949,322 A | * | 8/1960 | Closs | 277/373 |
| 3,244,425 A | * | 4/1966 | Cliffo | 277/390 |
| 3,469,851 A | * | 9/1969 | Enemark | 277/370 |
| 3,948,533 A | * | 4/1976 | Novosad | 277/370 |
| 4,413,831 A | * | 11/1983 | Washida et al. | 277/386 |
| 4,513,816 A | * | 4/1985 | Hubert | |
| RE31,933 E | * | 7/1985 | Taylor et al. | |
| 4,779,876 A | * | 10/1988 | Novosad | 377/397 |
| 4,832,351 A | * | 5/1989 | Ciotola | 277/387 |
| 4,998,740 A | * | 3/1991 | Tellier | 277/362 |
| 5,409,240 A | * | 4/1995 | Ballard | 277/366 |
| 5,598,763 A | * | 2/1997 | Rao et al. | 92/212 |
| 5,671,928 A | * | 9/1997 | Lanyi et al. | 277/461 |
| 6,012,900 A | * | 1/2000 | Kennedy et al. | |
| 6,302,405 B1 | * | 10/2001 | Edwards | |
| 6,318,526 B1 | * | 11/2001 | Kruckemeyer et al. | 188/322.17 |
| 6,341,781 B1 | * | 1/2002 | Matz et al. | 277/391 |
| 6,427,790 B1 | * | 8/2002 | Burr | 175/371 |

FOREIGN PATENT DOCUMENTS

| | | | |
|---|---|---|---|
| DE | 298 06 768 U1 | * | 4/1998 |
| WO | 00/62948 A1 | | 10/2000 |

* cited by examiner

*Primary Examiner*—Vishal Patel
(74) *Attorney, Agent, or Firm*—Kevin B. McGoff; James L. Kurka; Van Someren, PC

(57) ABSTRACT

A sealing apparatus is combined in a housing, such as a motor protector housing, having a hole extending therethrough. A shaft is movably disposed through the hole. A lip is disposed about the shaft and a ring is movably disposed about the shaft between the section and the lip. Sealing surfaces exist on opposite sides of the ring and on corresponding portions of the lip and the section. A polymeric coating is applied to at least one of the sealing surfaces. The polymeric coating may include a PEEK composite applied by an HVOF thermal spray process. A compressed spring assembly may be utilized to ensure a continuous seal.

22 Claims, 5 Drawing Sheets

PEEK COATED SEAL SURFACES

FIELD OF THE INVENTION

The present invention relates generally to polymeric coated bearing surfaces, and particularly to bearing surfaces in a submergible pumping system in which a polymeric material, such as a PEEK composite material, is bonded to the bearing surface.

BACKGROUND OF THE INVENTION

In producing petroleum and other useful fluids from production walls, it is generally known to provide a submergible pumping system for raising the fluids collected in a well. Production fluids enter a wellbore via perforations formed in a well casing adjacent a production formation. Fluids contained in the formation collect in the wellbore and may be raised by the submergible pumping system to a collection point above the earth's surface.

In a conventional bottom intake electric submergible pumping system, the system includes several components, such as a submergible electrical motor that supplies energy to a submergible pump. The system may further include a motor protector for isolating the motor from well fluids. A motor connector may also be used to provide a connection between the electrical motor and an electrical power supply. These and other components may be combined in the overall submergible pumping system.

The downhole environment where many submergible pumping systems are used is relatively harsh, subjecting the systems to high temperatures, corrosion, and wear caused by sand and grit suspended in the production fluid. Many areas of submergible pumping systems require reliable seals, which protect against the harsh environment. For example, motor protector seals are critical for preventing contamination of the motor oil with the well fluid.

Conventional seal faces are fabricated through molding and/or sintering processes, but these processes are relatively expensive and are often unworkable for intricate and/or large bearing surfaces. Attempts have been made to coat components at bearing surfaces. For example, thrust bearings have been produced in which the thrust bearing pads have a layer of PEEK material molded over the bearing surface of the pad. Most recently, carbon fiber reinforced PEEK rings have been fabricated for use as wear rings. Although the molding and sintering processes are successful for some components, the processes are costly and not conducive to coating complex surface areas such as inner curvatures.

PEEK coated seal surfaces would be advantageous in that they resist wear and corrosion, work in high temperature environments, and provide a low friction and non-rigid sealing surface for both rotational and stationary applications. It would also be advantageous to directly apply PEEK composite to a seal surface to provide greater flexibility in selecting the thickness, size, intricacy, and location of the seal surface.

SUMMARY OF THE INVENTION

The present invention features a sealing apparatus for a shaft. The sealing apparatus includes a body section having a hole extending therethrough to movably receive the shaft. To provide a seal, a lip is disposed about the shaft and a ring is movably disposed about the shaft between the body section and the lip. A plurality of sealing surfaces exist on opposite sides of the ring and on corresponding portions of the lip and the body section. A polymeric coating is applied to at least one of the sealing surfaces. As the ring is compressed between the body section and the lip, the polymeric coating provides a seal for both stationary and rotatable applications. In one embodiment of the invention, the polymeric coating comprises a PEEK composite that is thermally sprayed onto the sealing surfaces using a high velocity oxy fuel (HVOF) process.

According to another aspect of the invention, a compressed spring assembly is utilized to ensure a tight and continuous seal. The compressed spring assembly has a free end coupled to the lip, and has a mounting end coupled to the shaft. The shaft may extend through the spring assembly.

According to a further aspect of the invention, the section has a second ring sealingly disposed within a slot circumferencing the hole. To provide a reliable seal between the second ring and the slot, an o-ring is disposed in an outer groove of the second ring. The ring and/or the second ring may be manufactured from metal, ceramic, or any suitable material or combination thereof. Furthermore, in a preferred embodiment of the present invention, a polymer coating may be applied to the ring and/or the second ring.

According to another aspect of the invention, a method of placing a seal about a shaft is provided. The method includes deploying a shaft through a hole formed in an appropriate housing, and locating a mechanical seal between the shaft and the housing. A coating of polymeric material is applied to at least one of the mechanical seal and the housing. A seal is created by the coating(s) of polymeric material. Although a variety of materials and applications may be used, the preferred embodiment of the present invention uses an HVOF thermal spray process to apply a polymeric material comprising PEEK.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
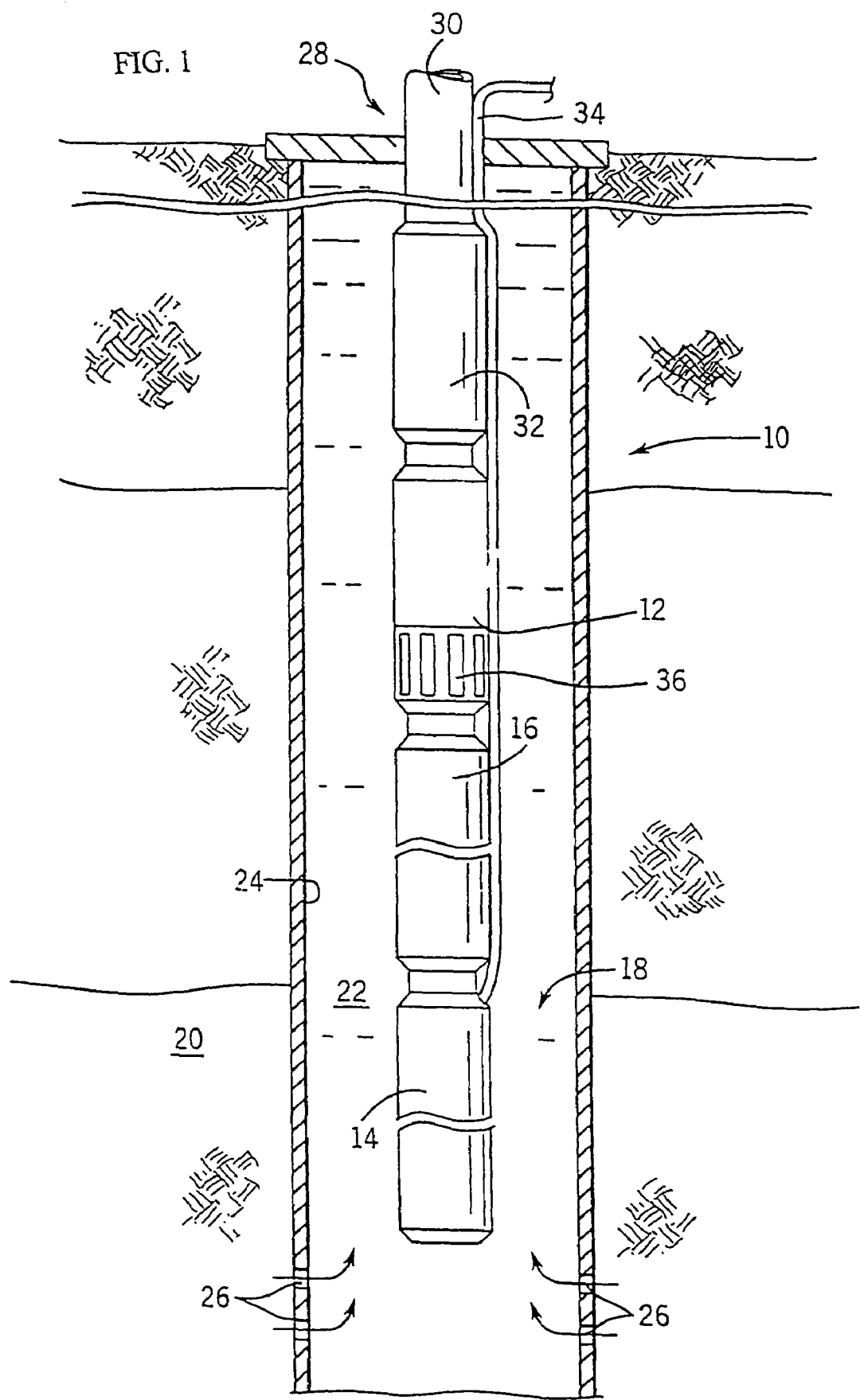
FIG. 1 is a front elevational view of a submergible pumping system positioned in a wellbore.

Referring generally to FIG. 1, an exemplary pumping system 10, such as a submergible pumping system, is illustrated. Pumping system 10 may comprise a variety of components depending on the particular application or environment in which it is used. Typically, system 10 includes at least a centrifugal pump 12, a motor 14 and a motor protector 16.

In the illustrated example, pumping system 10 is designed for deployment in a well 18 within a geological formation 20 containing desirable production fluids, such as petroleum. In a typical application, a wellbore 22 is drilled and lined with a wellbore casing 24. Wellbore casing 24 may include a plurality of openings 26 through which production fluids may flow into wellbore 22.

Pumping system 10 is deployed in wellbore 22 by a deployment system 28 that may have a variety of forms and configurations. For example, deployment system 28 may comprise tubing 30 connected to pump 12 by a connector 32. Power is provided to submergible motor 14 via a power cable 34. Motor 14, in turn, powers centrifugal pump 12 which draws production fluid in through a pump intake 36 and pumps the production fluid to the surface via tubing 30.

It should be noted that the illustrated submergible pumping system 10 is merely an exemplary embodiment. Other components can be added to the system, and other deployment systems may be implemented. Additionally, the production fluids may be pumped to the surface through tubing 30 or through the annulus formed between deployment system 28 and wellbore casing 24. In any of these configurations of submergible pumping system 10, it is desirable to attain the benefits of reliable seal surfaces in accordance with the present invention.

Referring to FIGS. 2-8, preferred embodiments of the present invention are described. These embodiments are examples of how polymer coatings, such as PEEK composite coatings, can be utilized on a variety of seal surfaces in pumping systems. For example, a PEEK composite coating, according to the present invention, can be utilized on seal rings used in motor protector 16.

Figure 2:
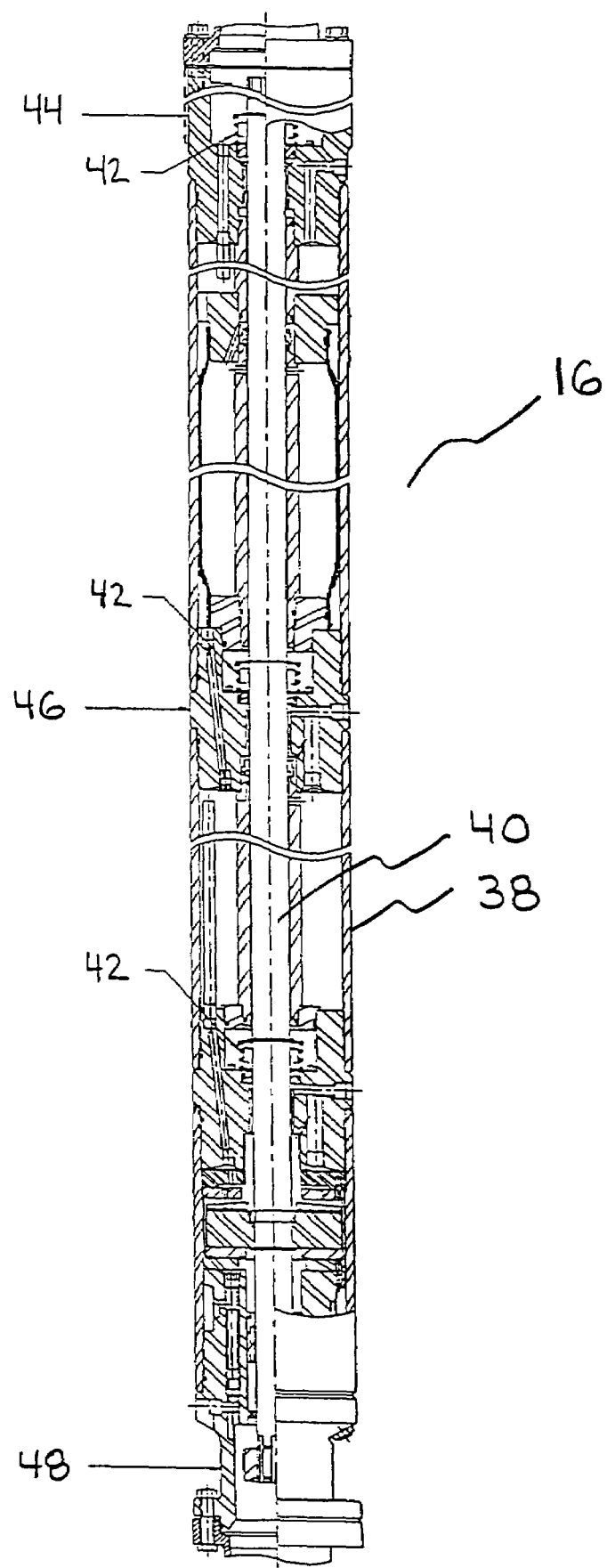
FIG. 2 is a cross-sectional view of a submergible motor protector.

Referring generally to FIG. 2, a cross-sectional view of motor protector 16 is illustrated. The motor protector 16 comprises a housing 38 for a central shaft 40, which transfers rotational motion from the motor 14 to the centrifugal pump 12. Mechanical seals 42 are disposed at a head 44, a body 46, and a base 48 of the motor protector 16 to isolate the motor oil from the well fluid, and vice versa. Depending on the application, the mechanical seals 42 may be rotatable or stationary. The arrangement of the motor protector components are generally known to those of ordinary skill in the art, and a variety of other configurations may be employed.

In any event, the motor protector 16 must reliably seal and isolate the motor oil from the well fluid. A coating of PEEK composite material has a low coefficient of friction and excellent seal and wear properties. Accordingly, rotatable seal surfaces are generally a prime target for application of a PEEK composite coating, according to a preferred embodiment of the present invention.

Figure 3:
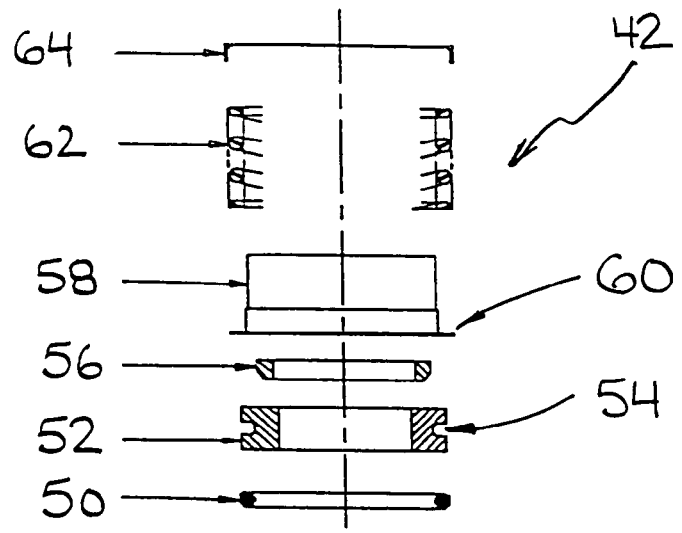
FIG. 3 is an exploded cross-sectional view of a mechanical seal for the submergible motor protector.

FIG. 3 illustrates an exploded cross-sectional view of the exemplary mechanical seal 42. Seal 42 comprises an o-ring 50, a stationary ring 52 having an outer groove 54, a rotatable ring 56, a sleeve 58 having a lip 60 about the sleeve 58, a spring 62, e.g. a coil spring, and a spring retainer 64. The stationary ring 52 and the rotatable ring 56 are preferably manufactured from like or different metallic or ceramic materials, such as silicon carbide or tungsten carbide.

Figure 4:
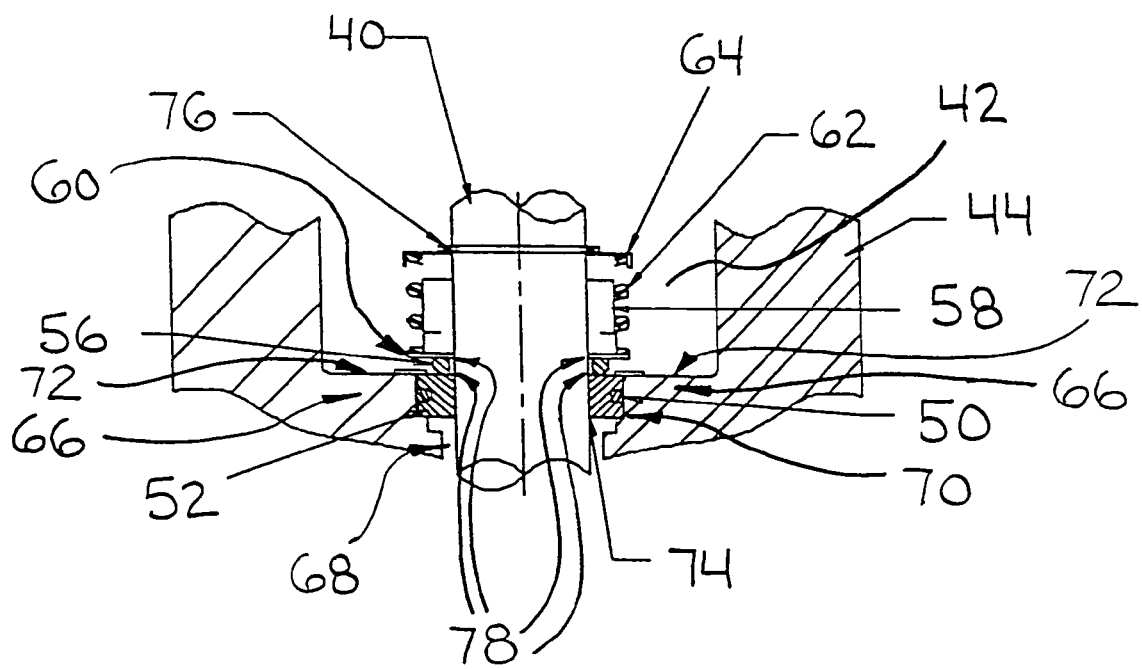
FIG. 4 is a cross-sectional view of the mechanical seal installed in a head of the submergible motor protector.

FIG. 4 illustrates a cross-sectional view of the mechanical seal 42 installed in a body, e.g. head 44. As illustrated, the head 44 includes a mid-section 66 having a hole 68 and a concentric slot 70 extending into the mid-section 66 from an axial outer surface 72 of mid-section 66. The central shaft 40 extends through hole 68, leaving a clearance 74 between shaft 40 and the surface defining hole 68.

The components of mechanical seal 42 are removably disposed about shaft 40, generally in the order depicted in FIG. 3. The o-ring 50 seats in outer groove 54 of stationary ring 52, which, in turn, sealingly fits into concentric slot 70. The rotatable ring 56 is disposed adjacent stationary ring 52, as illustrated in FIG. 4. Sleeve 58, led by lip 60, sealingly fits about the central shaft 40 adjacent rotatable ring 56. Spring 62 is disposed at least partially over sleeve 58 adjacent lip 60.

Finally, spring retainer 64 is placed against spring 62 opposite lip 60. Spring 62 is compressed by spring retainer 64 towards the stationary ring 52, and a snap ring 76 is affixed to the shaft adjacent spring retainer 64 and generally opposite spring 62. Compression of spring 62 creates sealing surfaces 78 between rotatable ring 56 and stationary ring 54, as well as between lip 60 and rotatable ring 56. According to a preferred embodiment of the present invention, a polymer coating is applied to at least one of the sealing surfaces 78 as discussed below.

Figure 5:
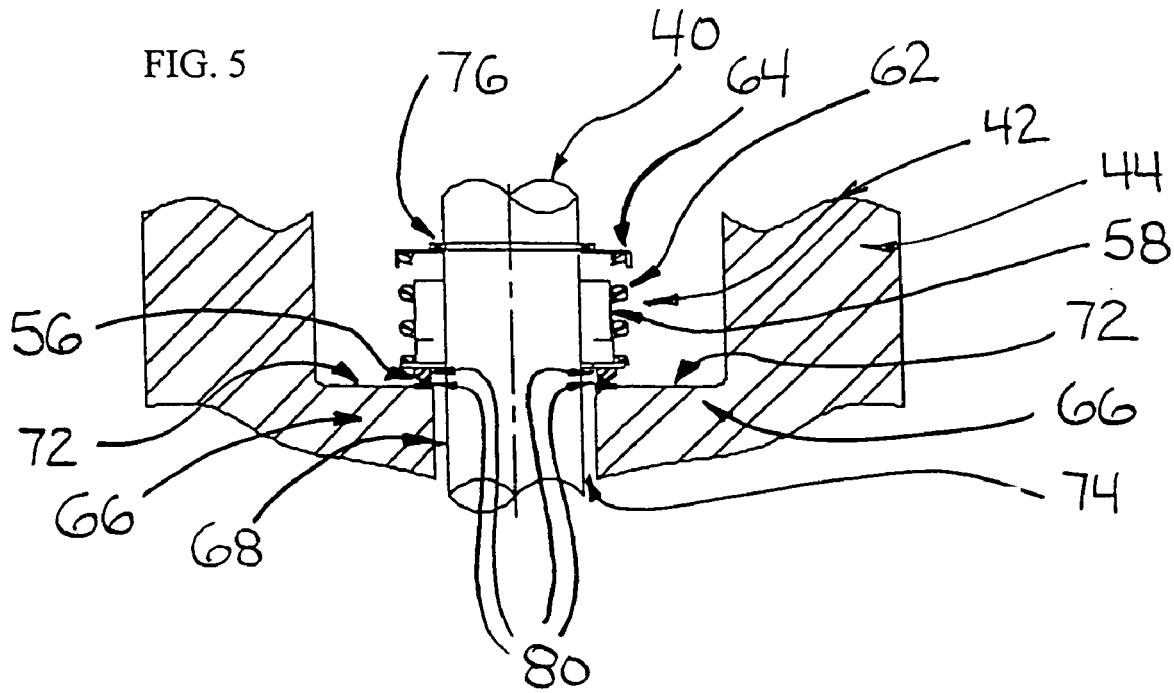
FIG. 5 is a cross-sectional view of an alternative embodiment of the mechanical seal installed in the head.

FIG. 5 is a cross-sectional view illustrating an alternative embodiment of mechanical seal 42 installed in a body, e.g. head 44, wherein the configuration differs in that the concentric slot 70, the stationary ring 52 and the o-ring 50 are eliminated. As described above, shaft 40 extends through hole 68, leaving a clearance 74 between shaft 40 and surface defining hole 68. The components of the mechanical seal 42 are removably disposed about the central shaft 40, generally in the order depicted in FIG. 3 with the exception of the stationary ring 52 and the o-ring 50.

In this embodiment, rotatable ring 56 seats adjacent the surface 72. Sleeve 58, led by lip 60, sealingly fits about shaft 40, and lip 60 is disposed adjacent rotatable ring 56. Spring 62 fits about the outer surface of sleeve 58 and against lip 60 opposite rotatable ring 56. Finally, spring retainer 64 is placed against spring 62 on an end of spring 62 opposite lip 60. Spring 62 is compressed by spring retainer 64 towards the surface 72, and a snap ring 76 is affixed to the shaft adjacent the spring retainer 64 on a side opposite spring 62. Compression of spring 62 causes sealing surfaces 80 to connect, thereby sealing rotatable ring 56 to surface 72, and lip 60 to the rotatable ring 56. According to a preferred embodiment of the present invention, a polymer coating is applied to at least one of the sealing surfaces 80 as discussed below.

Figure 6:
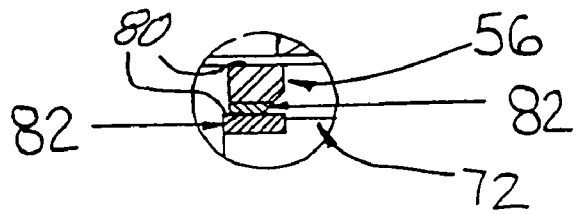
FIG. 6 is a magnified cross-sectional view of sealing surfaces between the mechanical seal and the head.
Figure 7:
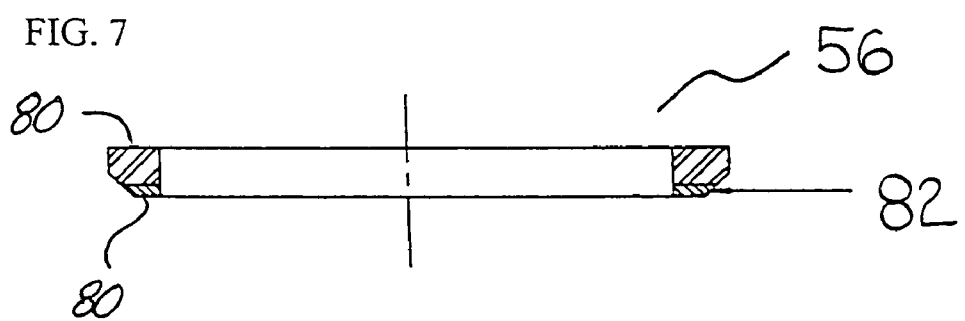
FIG. 7 is a magnified cross-sectional view of a rotatable ring of the mechanical seal.

FIG. 6 illustrates a magnified cross-sectional view of the sealing surfaces 80, wherein a polymer coating 82 is applied to the surface 72 and to the rotatable ring 56 adjacent the surface 72. FIG. 7 is a magnified cross-sectional view of the rotatable ring 56, further illustrating the application of the polymer coating 82 to the rotatable ring 56.

Figure 8:
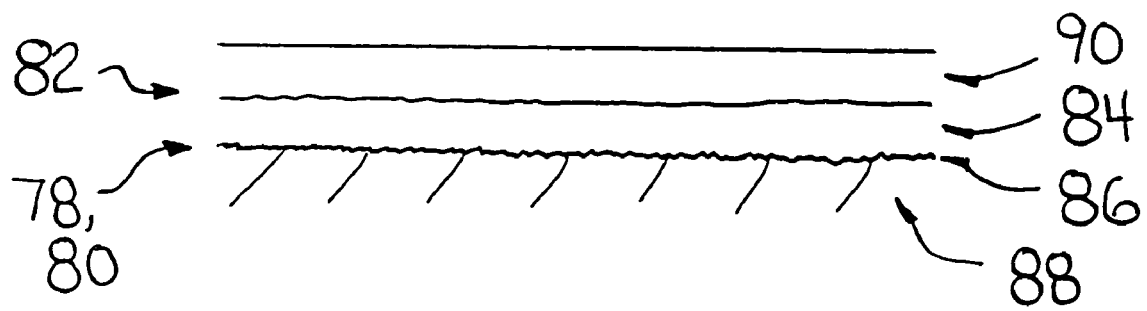
FIG. 8 is a cross-sectional view of layers in a polymeric coating.

FIG. 8 illustrates the cross-sectional view of the polymer coating 82, which preferably comprises a bonding layer 84 applied to a roughened surface 86 of a substrate 88, e.g. surface 72 of ring 56. A polymeric layer 90, such as a PEEK composite layer, is applied to the bonding layer 84. The PEEK composite layer 90 is preferably applied to the bonding layer 84 by a high velocity oxy fuel (HVOF) process. This HVOF process creates PEEK composite layer 90 by rapidly accelerating molten or partially molten particles of the PEEK composite material against bonding layer 84 and substrate 88. The stream of molten or partially molten platelets that hit the bonding layer 84 form a continuous coating, typically having a lamellar structure. The coating is extremely durable and has a low porosity, e.g. generally less than one percent porosity, for application as a bearing/wear surface.

The preferred process for applying a PEEK composite material to seal surfaces, e.g. 78 and 80, within a submergible pumping system is described in detail below. This process permits application of a PEEK composite material to a variety of components and seal surfaces of myriad shapes. It is particularly beneficial for the application of PEEK composite material to inside radii and diameters.

The preferred process for creating and applying PEEK composite layer 90 involves initial preparation of a substrate for receipt of a polymer layer via a thermal spray process. In the preferred embodiment, the substrate is a metallic or ceramic material, such as Ni Resist, stainless steel, silicon carbide, or tungsten carbide, but other materials may be appropriate depending on the specific application. A first step in the process is preparation of the substrate material. The substrate material preferably is cleaned by removing dirt, moisture, oil and other contaminants from the surface to be coated. To facilitate adherence, it is also desirable to roughen the surface to be coated. It is preferred that the surface be roughened by grit blasting. For example, the substrate may be grit blasted with aluminum oxide having a grit mesh size 28.

In another step of the process, the polymeric material is prepared for use in coating the substrate, e.g. 88. It is preferred that the polymeric material have a high melting temperature, i.e., above 300° C. In the most preferred embodiment, a PEEK material is used to prepare a composite material in powdered form. Although a variety of materials may be mixed with the PEEK material, it has been determined that a preferred composite comprises a mixture of PEEK with polytetrafluoroethylene (PTFE) and carbon. These materials enhance the low coefficient of friction and excellent wear properties of PEEK.

An exemplary ratio of materials is approximately 70% PEEK mixed with approximately 20% PTFE and approximately 10% carbon. Additionally, the selection of appropriate particle size can be important to the HVOF process. It has been determined that optimal particle sizes for the various components of the PEEK composite are approximately 70 microns for the PEEK; approximately 53 microns for the PTFE; and approximately 6 microns for the carbon particles. Although specific mixture percentages and particle sizes have been provided, other mixture ratios, particle sizes, and mixture components may be amenable to the process of the present invention.

After cleaning and grit blasting of the substrate material, e.g. 88, a bonding layer, e.g. 84, may be applied to the substrate. The bonding layer preferably is a metallic material having sufficient surface asperities to facilitate the mechanical bonding of the PEEK composite layer to the substrate. Preferably, a single layer of metallic material, such as nickel aluminum alloy, is applied. This material has desired characteristics at high temperature and provides excellent bonding to a stainless steel substrate. Other bonding layer materials may work better with substrates formed of materials other than stainless steel, such as ceramic substrates.

In the preferred embodiment, the nickel aluminum alloy is arc sprayed against the substrate. Arc spraying, as is generally known to those of ordinary skill in the art, uses a high energy electric arc generated by bringing two electrically energized wires into contact with each other. The arc energy melts the wires, and compressed air atomizes the molten material and propels it onto the substrate, leaving a bonding layer. Preferably, the bond layer has good thermal conductivity to help dissipate heat from the PEEK layer. It has been determined that an optimal thickness for the bond coat is in the range of approximately 0.014 to 0.018 inches.

Following preparation of the substrate, application of the bonding layer, and preparation of the PEEK composite material, the PEEK composite material is applied to the substrate over the bonding layer by a thermal spray. In the preferred embodiment, an HVOF process is utilized to apply the PEEK composite mixture to the substrate and the bonding layer. An optimum window of spray parameters has been established to ensure low porosity and great sealing properties.

Preferably, the HVOF process is carried out with the aid of a thermal spray gun, such as the Miller Thermal Spray Gun, Model HV2000, available from Miller Thermal, Inc. The Thermal Spray Gun is equipped with an axial powder feed configuration and is controlled by a Miller Thermal Computerized Console. The Thermal Spray Gun is equipped with a 12 mm combustion chamber, and the fuel gas, preferably hydrogen, to oxygen ratio is 3.33. Additionally, a carrier gas, preferably nitrogen, is flowed through the thermal spray gun at a flow rate of 30 scfh to feed powder into the combustion chamber.

The powderized PEEK composite mixture is fed to the thermal spray gun via an electronically controlled, pressurized hopper unit, as is well known to those of ordinary skill in the art. The PEEK composite material is then injected through the flame of the HVOF thermal spray gun and heated to at least the melting point of the PEEK composite material, e.g. approximately 340° C. The powder particles of the PEEK composite are partially or preferably fully melted and propelled towards the substrate and bonding layer. This creates a stream of semi-molten or molten particles or platelets that hit the substrate to form a continuous coating typically having a lamellar structure. A mechanical interlocking process takes place between the particles and the rough substrate/bonding layer to securely bond the continuous coating to the substrate.

In the preferred embodiment, the PEEK composite powder is fed at a rate of 11 grams per minute and the thermal spray gun is moved at a traverse speed of 754 millimeters per second with a standoff of 7 inches. (The standoff refers to the distance between the substrate and the outlet tip of the thermal spray gun.) The PEEK composite coating is built up in multiple passes to a thickness between approximately 0.019 inches and 0.021 inches. Typically, there is one preheat cycle and 30 passes, following which, the coating is allowed to cool by a natural slow cool.

After application of the PEEK composite mixture to form a PEEK composite layer, e.g. PEEK composite layer 90, it may be advantageous to adopt a post-deposition annealing process. The post-deposition annealing process provides a more durable coating. It facilitates the removal of the thermal history and residual stress. It also increases the level of crystallinity of the PEEK composite coating.

A preferred post-deposition annealing process comprises heating the PEEK composite layer to approximately 400° C. and holding it at that temperature for approximately 30 minutes. The PEEK composite layer (90), along with the substrate (88) and bonding layer (84), then undergoes a controlled cooling to approximately 270° C. at which temperature it is held for approximately 10 minutes. Thereafter, the PEEK composite layer, substrate and bonding layer undergo a controlled cooling to below 60° C.

It will be understood that the foregoing description is of preferred exemplary embodiments of this invention, and that the invention is not limited to the specific forms shown. For example, the precise mixture of constituents in the PEEK composite may be adjusted for desired applications or effects; the HVOF parameters may be adjusted according to the PEEK composite mixture, the particulate size, the type of HVOF thermal spray gun utilized and the environment in which the process is implemented may be changed; and the bonding layer material may be adjusted according to the various other parameters, including the material used in formation of the substrate. These and other modifications may be made in the design and arrangement of the elements without departing from the scope of the invention as expressed in the appended claims.

What is claimed is:

1. A sealing apparatus for a shaft comprising:
   a body having a hole extending through a section of the body;
   a shaft movably disposed through the hole;
   a sleeve having a lip disposed about the shaft;
   a ring movably disposed about the shaft between the section and the lip, the ring being movable relative to the section and the lip;
   a spring disposed at least partially over the sleeve on an opposite side of the lip from the ring, the spring acting between the lip and a spring retainer coupled to the shaft;
   a plurality of sealing wear surfaces to provide sliding wear surfaces during rotation of the shaft, the plurality of sealing wear surfaces being on the ring and on at least one of the corresponding portions of the lip and the section; and
   a polymeric coating on at least one of the sealing wear surfaces.

2. The sealing apparatus of claim 1, wherein the spring is compressed between the lip and the spring retainer and has a free end coupled to the lip.

3. The sealing apparatus of claim 2, wherein the spring retainer is affixed to the shaft.

4. The sealing apparatus of claim 2, wherein the shaft extends through the spring assembly.

5. The sealing apparatus of claim 1, wherein the polymeric coating comprises PEEK.

6. The sealing apparatus of claim 1, wherein the ring comprises a ceramic material.

7. The sealing apparatus of claim 1, wherein the ring comprises a metallic material.

8. The sealing apparatus of claim 1, wherein the section further comprises a slot circumfering the hole and a second ring removably disposed about the shaft and in the slot.

9. The sealing apparatus of claim 8, further comprising an o-ring sealingly disposed between the slot and the second ring.

10. The sealing apparatus of claim 8, wherein the second ring comprises a ceramic material.

11. The sealing apparatus of claim 8, wherein the second ring comprises a metallic material.

12. A sealing apparatus for a submergible motor protector, comprising:
    a motor protector housing having a hole extending through a cross-member of the housing;
    a shaft movably disposed in the hole;
    a lip disposed about the shaft;
    a ring movably disposed about the shaft between the lip and the cross-member;
    a plurality of sealing wear surfaces to provide sliding wear surfaces during rotation of the shaft, the plurality of sealing wear surfaces being on the ring and corresponding contact portions of the lip and the cross-member; and
    a polymeric coating on at least one of the sealing wear surfaces.

13. The sealing apparatus of claim 12, wherein the polymeric coating comprises PEEK.

14. A method of sealing a rotatable shaft comprising:
    providing a motor protector housing having a hole;
    deploying a shaft through the hole;
    forming a mechanical seal with a rotatable ring formed of a hard wear resistant material;
    locating the mechanical seal between the shaft and the housing;
    coating polymeric material on at least one of the mechanical seal and the housing to form a wear surface between the rotatable ring and the housing; and
    creating a seal at the coating of polymeric material.

15. The method of claim 14, further comprising grinding and polishing the sealing surfaces to desired dimensions and smoothness.

16. The method of claim 14, wherein the coating step comprises a thermal spray process.

17. The method of claim 16, wherein the thermal spray process comprises an HVOF (High Velocity Oxy-Fuel) thermal spray process.

18. The method of claim 14, wherein the polymeric material comprises PEEK.

19. The method of claim 14, further comprising:
    providing a lip sealingly disposed about the shaft;
    providing a ring movably disposed about the shaft between the housing and the lip; and
    compressing the ring between the lip and the housing.

20. The method of claim 19, further comprising:
    providing a spring assembly;
    coupling a free end of the spring assembly to the lip;
    compressing the spring assembly; and
    coupling a mounting end of the spring assembly to the shaft.

21. The method of claim 20, further comprising affixing the mounting end to the shaft.

22. The method of claim 21, further comprising extending the shaft through the spring assembly.

* * * * *